Sept. 20, 1932.   C. C. BENNETT   1,878,664
WHEEL ALIGNMENT GAUGE
Filed Sept. 3, 1929
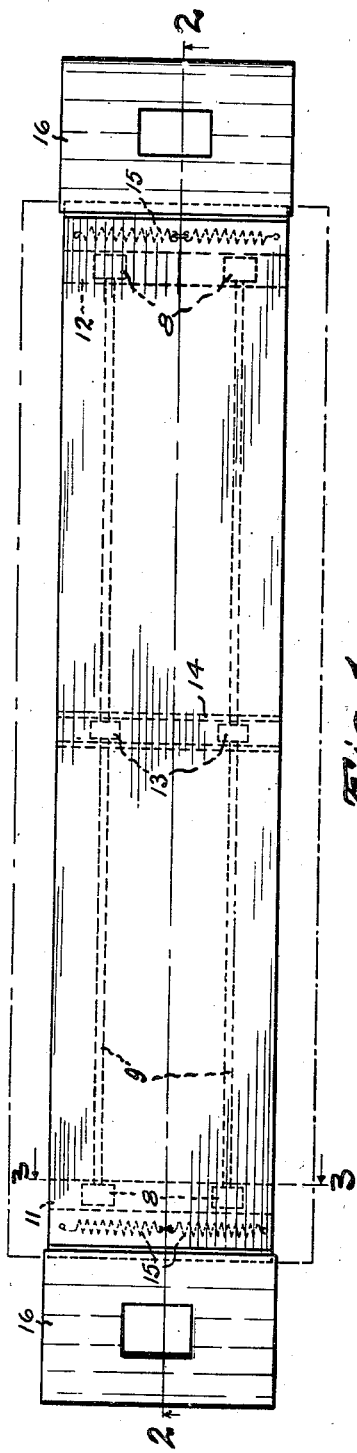
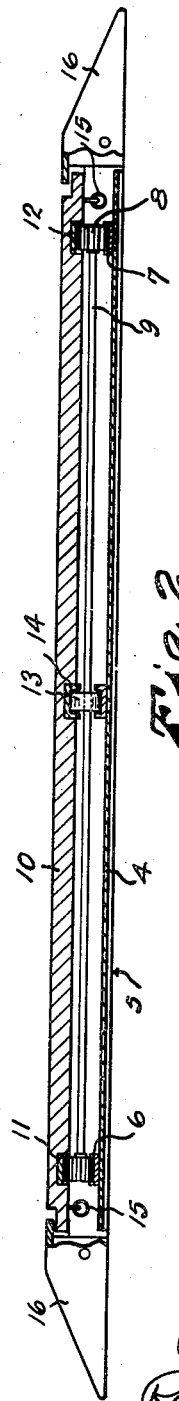
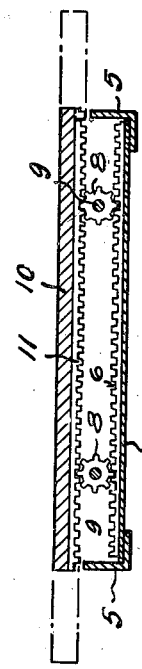
INVENTOR
Claude C. Bennett
BY
Reynolds & Reynolds
HIS ATTORNEYS Patented Sept. 20, 1932

1,878,664

UNITED STATES PATENT OFFICE

CLAUDE C. BENNETT, OF SEATTLE, WASHINGTON, ASSIGNOR TO A. E. FERAGEN, INC., OF SEATTLE, WASHINGTON, A CORPORATION OF WASHINGTON

WHEEL ALIGNMENT GAUGE

Application filed September 3, 1929. Serial No. 390,156.

My invention relates to improvements in motor vehicle wheel gauges and is in the nature of an improvement on the wheel gauge disclosed in my prior Patent No. 1,675,481, issued July 3, 1926 and in application, Serial No. 261,439, filed March 14, 1929. A companion application discloses another form of such a gauge.

The general object of my invention, as in my patent and applications, is to provide a motor vehicle wheel gauge that will indicate whether or not the front wheel of a motor vehicle is so set that abrasive action and tire wear occurs, when the wheel is caused to travel over the gauge, thus making it possible to determine when the wheel is out of alignment, and substantially the amount that said wheel is out of alignment, by driving the opposite wheel over the gauge.

Another general object is to provide a gauge in the nature of a runner board or platform of considerable length in the direction of movement of the wheel, that is mounted for sidewise movement, so that when a wheel is rolled lengthwise along said board the board will be deflected bodily sidewise in case the wheel is out of alignment, the amount of sidewise deflection of the runner board, for any given distance run, being proportional to the amount that the wheel is out of proper adjustment.

A more specific object is to provide a runner board of this nature that has rack and pinion means between the runner board and its support for insuring that both ends of the board will always be deflected sidewise the same amount and in the same direction.

Other and more specific objects will be apparent from the following description taken in connection with the accompanying drawing.

In the drawing Figure 1 is a plan view of a wheel gauge constructed in accordance with my invention.

Figure 2 is a sectional view of the same substantially on broken line 2—2 of Figure 1.

Figure 3 is a cross section on a larger scale on broken line 3—3 of Figure 1.

In Figures 1 and 3 certain operative positions that the runner board may assume are shown by dot and dash lines.

The front wheels of a motor vehicle, when they are properly adjusted, are cambered, so that they are closer together at their bottoms than at their tops. This camber is supplemented by toe-in, meaning that the extreme front of the tires are closer together than their extreme rear points. Each setting affects the other, but usually when abrasive action occurs it is due to faulty toe-in. This invention, then, is chiefly concerned with toe-in, though broadly speaking it is concerned with the determination of whether or not abrasion is present.

The adjustment for toe-in or pitch is ordinarily made so that the distance between the centers of the tires in front of the wheel in a horizontal plane that bisects the axes is from one fourth to three eighths of an inch less than the distance between corresponding points at the rear of the wheel. This adjustment for toe-in or pitch is usually made by adjusting the effective length of the steering knuckle tie rod, and the wheels are checked for the adjustment by measuring the distance between corresponding points on the tire at the front and rear of the wheel. My gauge eliminates the necessity of making these necessarily exact measurements, which are especially difficult to make with modern low-hung cars, and shows accurately and quickly whether or not the wheel is out of alignment and how much it is out.

In the drawing I show a base preferably formed of two longitudinally extending, spaced apart, parallel side angles 5 secured together by a bottom plate 4 that rests on their horizontal flanges.

Extending crosswise of the base between the two side angles 5 are a plurality of rack bars 6 and 7, two or more in number, and two of which I prefer to locate near the opposite ends of the base frame. The rack bars 6 and 7 serve as tracks and supports for gear pinions 8 which are secured on shafts 9 that extend lengthwise of the gauge. A runner board 10 is provided on its bottom side with rack bars 11 and 12 that mesh with, and which may rest upon the gear pinions 8, whereby the runner board is supported for sidewise parallel movement in either direction on the frame. The gear pinions, being secured to the shafts 9, compel a like movement of both ends of the board in the same direction whenever said board is deflected. The runner board 10 may be supported entirely by the pinions 8, or it may be supported on separate antifriction bearings and the pinions 8, shafts 9 and rack bars 6, 7, 11 and 12 may be used for the purpose of obtaining a parallel motion only. In the drawing I have shown rollers 13 mounted on the shafts 9 between the pinions 8 to assist in supporting the runner board 10, the rollers running in trackways 14.

Balanced springs 15 are provided for always returning the runner board 10 to its initial or mid position. Inclined approaches 15 are provided at the ends of the runner board.

When in use, my gauge is adapted to rest upon the garage floor or pavement and the front vehicle wheel opposite that the alignment of which is to be tested is caused to travel along the runner board from one end toward the other end of the same. If the floor-engaging wheel is correctly adjusted the runner board will not be deflected sidewise in either direction. If the wheel is out of proper alignments—for instance, if it toes in too much—then it will deflect the runner board outwardly. If said wheel toes out too much then it will deflect the runner board inwardly, the amount of movement of the runner board, for each unit of distance in the direction of the wheel's advance, being proportional to the amount of error in the adjustment of the wheel.

To obtain a correction indication of the error involved in the adjustment of a wheel I find it necessary to have the runner board of substantial length so that the tire of the wheel may be caused to roll a considerable portion of its circumference over said runner board, thus minimizing local errors and accumulating the small and almost imperceptible misalignments per unit length of the periphery.

The foregoing description and accompanying drawing clearly disclose a preferred embodiment of my invention but it will be understood that this disclosure is merely illustrative and that such changes in the invention may be made as are fairly within the scope and spirit of the following claims.

What I claim as my invention is:

1. A vehicle wheel gauge, embodying a support, a runner board disposed above the support, a longitudinally extending shaft between the support and the runner board, spaced apart gear pinions fixed on said shaft, and gear racks on the support and on the runner board and meshing with the gear pinions.

2. A vehicle wheel gauge, embodying a support, a runner board extending beneath and longitudinally of said support, a plurality of longitudinally extending shafts between the board and its support, gear pinions secured to the shafts near opposite ends of the support, transverse gear racks on the support for the gear pinions to run on, and other transverse gear racks on the bottom of the runner board arranged to rest upon the pinions, whereby said gear racks and pinions and shafts compel transverse movement of said runner board through positions, parallel to its initial position.

Signed at Seattle, Washington.

CLAUDE C. BENNETT.